United States Patent
Yang et al.

(10) Patent No.: US 11,769,011 B2
(45) Date of Patent: Sep. 26, 2023

(54) UNIVERSAL LANGUAGE SEGMENT REPRESENTATIONS LEARNING WITH CONDITIONAL MASKED LANGUAGE MODEL

(71) Applicant: Google LLC, Mountain View, CA (US)

(72) Inventors: Yinfei Yang, Sunnyvale, CA (US); Ziyi Yang, Palo Alto, CA (US); Daniel Matthew Cer, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 263 days.

(21) Appl. No.: 17/127,734

(22) Filed: Dec. 18, 2020

(65) Prior Publication Data

US 2022/0198144 A1    Jun. 23, 2022

(51) Int. Cl.
*G06F 40/284* (2020.01)
*G06N 3/04* (2023.01)
*G06N 20/00* (2019.01)

(52) U.S. Cl.
CPC ........... *G06F 40/284* (2020.01); *G06N 3/04* (2013.01); *G06N 20/00* (2019.01)

(58) Field of Classification Search
CPC ......... G06F 40/284; G06N 20/00; G06N 3/04
See application file for complete search history.

(56) References Cited

U.S. PATENT DOCUMENTS

2022/0067280 A1 * 3/2022 Wagner .................... G06N 3/08
2022/0171936 A1 * 6/2022 Wang .................... G06F 40/237

OTHER PUBLICATIONS

Yu, Adams Wei, David Dohan, Minh-Thang Luong, Rui Zhao, Kai Chen, Mohammad Norouzi, and Quoc V. Le, "QANet: Combining Local Convolution with Global Self-Attention for Reading Comprehension", Feb. 2018, International Conference on Learning Representations (ICLR 2018), pp. 1-16. (Year: 2018).*
Melamud, Oren, Jacob Goldberger, and Ido Dagan, "context2vec: Learning Generic Context Embedding with Bidirectional LSTM", Aug. 2016, Proceedings of the 20th SIGNLL Conference on Computational Natural Language Learning (CoNLL), pp. 51-61. (Year: 2016).*
Dehghani, Mostafa, Stephan Gouws, Oriol Vinyals, Jakob Uszkoreit, and Lukasz Kaiser, "Universal Transformers", May 2019, International Conference on Learning Representations (ICLR0 2019), pp. 1-23. (Year: 2019).*

(Continued)

*Primary Examiner* — Daniel C Washburn
*Assistant Examiner* — James Boggs
(74) *Attorney, Agent, or Firm* — Dority & Manning, P.A.

(57) ABSTRACT

The present disclosure provides a novel sentence-level representation learning method Conditional Masked Language Modeling (CMLM) for training on large scale unlabeled corpora. CMLM outperforms the previous state-of-the-art English sentence embedding models, including those trained with (semi-)supervised signals. For multilingual representations learning, it is shown that co-training CMLM with bitext retrieval and cross-lingual natural language inference (NL) fine-tuning achieves state-of-the-art performance. It is also shown that multilingual representations have the same language bias and principal component removal (PCR) can eliminate the bias by separating language identity information from semantics.

20 Claims, 9 Drawing Sheets

(56) References Cited

OTHER PUBLICATIONS

Lample, Guillaume, and Alexis Conneau, "Cross-lingual Language Model Pretraining", Jan. 2019, 33rd Conference on Neural Information Processing Systems (NeurIPS 2019), pp. 1-11. (Year: 2019).*

Conneau, Alexis, Guillaume Lample, Ruty Rinott, Adina Williams, Samuel Bowman, Holger Schwenk, and Veselin Stoyanov, "XNLI: Evaluating Cross-lingual Sentence Representations", Oct. 2018, Proceedings of the 2018 Conference on Empirical Methods in Natural Language Processing (EMNLP), pp. 2475-2485. (Year: 2018).*

Arora, Sanjeev, Yingyu Liang, and Tengyu Ma, "A Simple but Tough-to-Beat Baseline for Sentence Embeddings", Apr. 2017, ICLR, pp. 1-16. (Year: 2017).*

Qi, Di, Lin Su, Jianwei Song, Edward Cui, Taroon Bharti, and Arun Sacheti, "ImageBERT: Cross-modal Pre-training with Large-scale Weak-supervised Image-Text Data", Jan. 2020, ArXiv abs/2001.07966, pp. 1-12. (Year: 2020).*

Yang, Ziyi, Yinfei Yang, Daniel Cer, Jax Law, and Eric Darve, "Universal Sentence Representation Learning with Conditional Masked Language Model", Nov. 2021, Proceedings of the 2021 Conference on Empirical Methods in Natural Language Processing, pp. 6216-6228. (Year: 2021).*

Artetxe et al., "Massively Multilingual Sentence Embeddings for Zero-Shot Cross-Lingual Transfer and Beyond", Transactions of the Association for Computational Linguistics, vol. 7, 2019, pp. 597-610.

Bowman et al., "A large annotated corpus for learning natural language inference", 2015 Conference on Empirical Methods in Natural Language Processing, Sep. 17-21, 2015, Lisbon, Portugal, pp. 632-642.

Cer et al., "Universal Sentence Encoder", arXiv:1803.11175v2, Apr. 12, 2018, 7 pages.

Chidambaram et al., "Learning Cross-Lingual Sentence Representations via a Multi-task Dual-Encoder Model", Workshop on Representation Learning for NLP (RepL4NLP), Aug. 2, 2019, Florence, Italy, pp. 250-259.

Conneau et al., "SentEval: An Evaluation Toolkit for Universal Sentence Representations", Eleventh International Conference on Language Resources and Evaluation (LREC 2018), May 7-12, 2018, Miyazaki, Japan, 6 pages.

Conneau et al., "Supervised Learning of Universal Sentence Representations from Natural Language Inference Data", 2017 Conference on Empirical Methods in Natural Language Processing, Sep. 7-11, 2017, Copenhagen, Denmark, 12 pages.

Devlin et al., "BERT: Pre-training of Deep Bidirectional Transformers for Language Understanding", 2019 Conference of the North American Chapter of the Association for Computational Linguistics: Human Language Technologies, Jun. 2-7, 2019, Minneapolis, Minnesota, pp. 4171-4186.

Eriguchi et al., "Zero-Shot Cross-lingual Classification Using Multilingual Neural Machine Translation", arXiv:1809.04686v1, Sep. 12, 2018, 8 pages.

Feng et al., "Language-agnostic BERT Sentence Embedding", arXiv:2007.01852v1, Jul. 3, 2020, 13 pages.

Hu et al., "Mining and Summarizing Customer Reviews", ACM SIGKDD International Conference on Knowledge Discovery and Data Mining, Aug. 22-25, 2004, Seattle, Washington, 10 pages.

Kiros et al., "Skip-Thought Vectors", Twenty-ninth Conference on Neural Information Processing Systems, Dec. 7-12, 2015, Montreal, Canada, 9 pages.

Lan et al., "ALBERT: A Lite BERT for Self-Supervised Learning of Language Representations", International Conference on Learning Representations. Apr. 26-May 1, 2020, Ethiopia, Africa, 17 pages.

Liu et al., "RoBERTa: A Robustly Optimized BERT Pretraining Approach", arXiv:1907.11692v1, Jul. 26, 2019, 13 pages.

Logeswaran et al., "An Efficient Framework for Learning Sentence Representations", $6^{th}$ International Conference on Learning Representations, Apr. 30-May 3, 2018, Vancouver, BC, Canada, 16 pages.

Marelli et al., "A SICK cure for the evaluation of compositional distributional semantic models", $9^{th}$ International Conference on Language Resources and Evaluation (LREC ' 14), May 26-31, 2014, Reykjavik, Iceland, 8 pages.

Pang et al., "A Sentimental Education: Sentiment Analysis Using Subjectivity Summarization Based on Minimum Cuts", 42nd Annual Meeting on Association for Computational Linguistics, Jul. 21-26, 2004, Barcelona, Spain, 8 pages.

Pang et al., "Seeing stars: Exploiting class relationships for sentiment categorization with respect to rating scales", $43^{rd}$ Annual Meeting on Association for Computational Linguistics, Jun. 25-30, 2005, Ann Arbor, Michigan, 10 pages.

Prettenhofer et al., "Cross-Language Text Classification using Structural Correspondence Learning", $48^{th}$ Annual Meeting of the Association for Computational Linguistics, Jul. 11-16, 2010, Uppsala, Sweden, pp. 1118-1127.

Raffel et al., "Exploring the Limits of Transfer Learning with a Unified Text-to-Text Transformer", arXiv:1910.10683v2, Oct. 24, 2019, 53 pages.

Reimers et al., "Sentence-BERT: Sentence Embeddings using Siamese BERT-Networks", 2019 Conference on Empirical Methods in Natural Language Processing and the $9^{th}$ International Joint Conference on Natural Language Processing (EMNLP-IJCNLP), Nov. 3-7, 2019, Hong Kong, China, pp. 3982-3992.

Roy et al., "LAReQA: Language-agnostic answer retrieval from a multilingual pool", arXiv:2004.05484v1, Apr. 11, 2020, 12 pages.

Ruder et al., "Unsupervised Cross-Lingual Representation Learning", $57^{th}$ Annual Meeting of the Association for Computational Linguistics: Tutorial Abstracts, Jul. 28-Aug. 2, 2019, Florence, Italy, pp. 31-38.

Socher et al., "Recursive Deep Models for Semantic Compositionality Over a Sentiment Treebank", 2013 Conference on Empirical Methods in Natural Language Processing, Oct. 18-21, 2013, Seattle, Washington, pp. 1631-1642.

Subramanian et al., "Learning General Purpose Distributed Sentence Representations via Large Scale Multi-Task Learning", International Conference on Learning Representations, Apr. 30-May 3, 2018, Vancouver, Canada, 16 pages.

Voorhees et al., "Building a Question Answering Test Collection", $23^{rd}$ Annual International ACM SIGIR Conference on Research and Development in Information Retrieval, Jul. 24-28, 2000, Athens, Greece, 8 pages.

Williams et al., "A Broad-Coverage Challenge Corpus for Sentence Understanding through Inference", 2018 Conference of the North American Chapter of the Association for Computational Linguistics: Human Language Technologies, Jun. 1-6, 2018, New Orleans, Louisiana, pp. 1112-1122.

Yang et al., "Improving Multilingual Sentence Embedding using Bi-directional Dual Encoder with Additive Margin Softmax", Twenty-Eighth International Joint Conference on Artificial Intelligence (IJCAI-19), Aug. 10-16, 2019, Macao, China, 9 pages.

Yang et al., "Multilingual Universal Sentence Encoder for Semantic Retrieval", arXiv:1907.04307v1, Jul. 9, 2019, 6 pages.

Yang et al., "Parameter-free Sentence Embedding via Orthogonal Basis", 2019 Conference on Empirical Methods in Natural Language Processing and the $9^{th}$ International Joint Conference on Natural Language Processing (EMNLP-IJCNLP), Nov. 3-7, 2019, Hong Kong, China, pp. 638-648.

Yang et al., "PAWS-X: A Cross-lingual Adversarial Dataset for Paraphrase Identification", 2019 Conference on Empirical Methods in Natural Language Processing and the $9^{th}$ International Joint Conference on Natural Language Processing (EMNLP-IJCNLP), Nov. 3-7, 2019, Hong Kong, China, pp. 3687-3692.

* cited by examiner

UNIVERSAL LANGUAGE SEGMENT REPRESENTATIONS LEARNING WITH CONDITIONAL MASKED LANGUAGE MODEL

FIELD

The present disclosure relates generally to machine learning. More particularly, the present disclosure relates to techniques for learning universal sentence representations with conditional masked language models.

BACKGROUND

Language segment embeddings (e.g., sentence embeddings) can represent a language segment (e.g., a sentence) mapped into an embedding space (e.g., a latent representational space which can be represented using numerical vectors). The embeddings can capture rich semantic information that can be used to measure semantic textual similarity (STS) between language segments or train classifiers for a broad range of downstream tasks.

State-of-the-art models for producing language segment embeddings are usually trained on supervised tasks such as natural language inference, or with semi-structured data like question-answer pairs, translation pairs, or conversational input response pairs. However, labeled and semi-structured data are difficult and expensive to obtain, making it hard to cover many domains and languages.

Conversely, recent efforts to improve language models include the development of masked language model (MLM) pre-training from large scale unlabeled corpora. While internal MLM model representations are helpful when fine-tuning on downstream tasks, they do not directly produce good language segment embeddings, without further supervised or semi-structured fine-tuning.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to train machine learning models to produce representations for language segments containing multiple tokens. The method includes processing, by a computing system comprising one or more computing devices, one or more first language segments of a plurality of language segments with a first machine-learned language encoding model to generate a contextual language embedding, wherein each of the plurality of language segments comprises multiple tokens. The method includes generating, by the computing system, a masked version of a subject language segment of the plurality of language segments, wherein the masked version of the subject language segment comprises one or more masked tokens. The method includes combining, by the computing system, the contextual language embedding and the masked version of the subject language segment to obtain a conditioned input. The method includes processing, by the computing system, the conditioned input with a second machine-learned language encoding model to generate one or more predictions respectively for the one or more masked tokens. The method includes modifying, by the computing system, one or more values of one or more parameters of at least the first machine-learned language encoding model based on a loss function that compares the one or more predictions respectively with the one or more masked tokens.

Another example aspect of the present disclosure is directed to a computing system. The computing system includes one or more processors and one or more non-transitory computer-readable media that collectively store a machine-learned language encoding model configured to process a language segment that comprises a plurality of tokens to generate an embedding that describes the language segment in an embedding space, wherein the machine-learned language encoding model has been trained using a loss function that evaluates an ability of an additional language encoding model to perform a masked language modeling task when conditioned upon embeddings generated by the machine-learned language encoding model and instructions that, when executed by a computing system comprising one or more computing devices, cause the computing system to perform operations. The operations include obtaining an additional language segment that contains multiple tokens. The operations include using the machine-learned language encoding model to generate an embedding for the additional language segment. The operations include performing a language task based on the embedding for the additional language segment.

Another example aspect of the present disclosure is directed to one or more non-transitory computer-readable media that collectively store instructions that, when executed by a computing system comprising one or more computing devices, cause the computing system to perform operations. The operations include processing, by the computing system, one or more sets of context data with a first machine-learned encoding model to generate a contextual embedding. The operations include generating, by the computing system, a masked version of a subject language segment, wherein the masked version of the subject language segment comprises one or more masked tokens. The operations include combining, by the computing system, the contextual embedding and the masked version of a subject language segment to obtain a conditioned input. The operations include processing, by the computing system, the conditioned input with a second machine-learned encoding model to generate one or more predictions respectively for the one or more masked tokens. The operations include modifying, by the computing system, one or more values of one or more parameters of at least the first machine-learned encoding model based on a loss function that compares the one or more predictions respectively with the one or more masked tokens.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
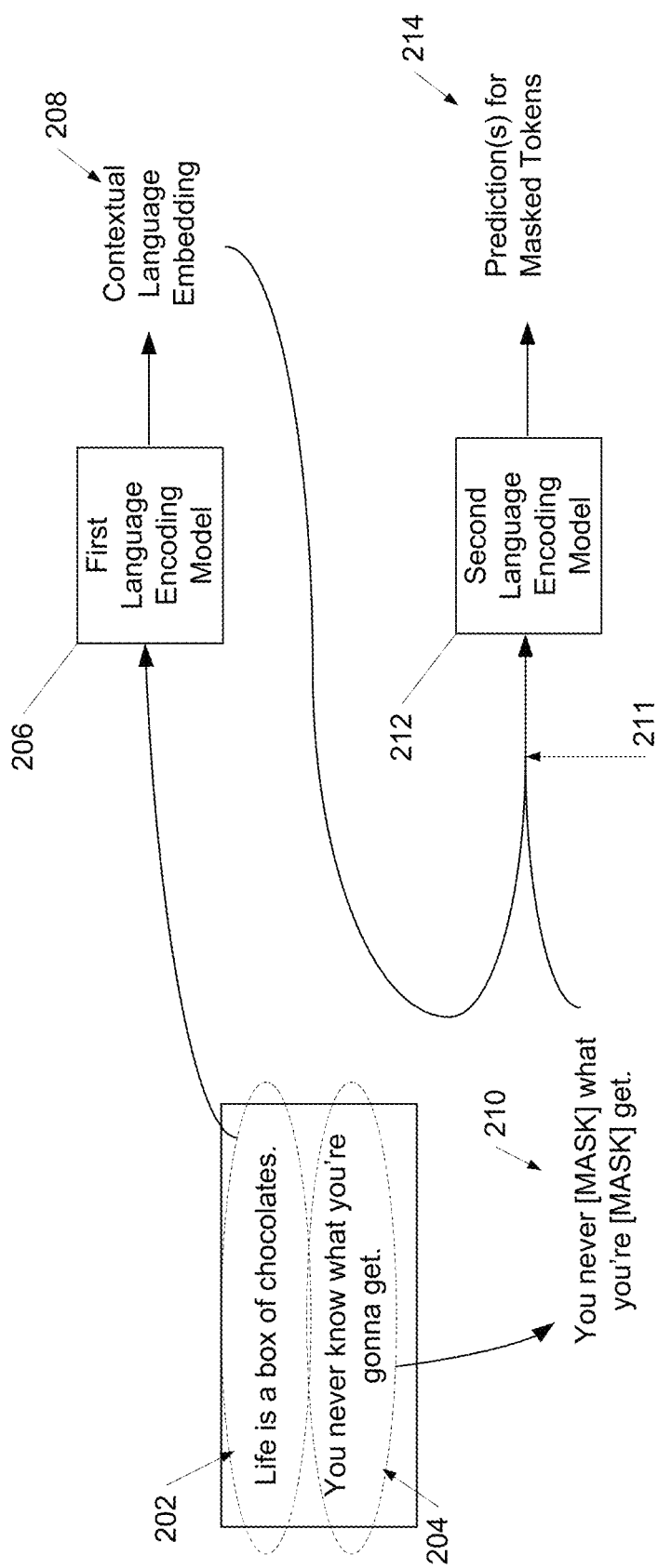
FIG. 1 depicts a block diagram of an example process for learning universal language segment representations with conditional masked language models according to example embodiments of the present disclosure.

Reference numerals that are repeated across plural figures are intended to identify the same features in various implementations.

DETAILED DESCRIPTION

1. Overview

Generally, the present disclosure is directed to systems and methods which enable machine learning models to effectively learn language segment representations (e.g., sentence representations, paragraph representations, page representations, etc.) on large scale unlabeled corpora. Example implementations of the present disclosure may be referred to as Conditional Masked Language Modeling (CMLM). CMLM integrates language segment representation learning into MLM training by conditioning on the encoded embeddings of contextual language segments (e.g., sentences which are adjacent to a subject sentence). Thus, one example aspect of the present disclosure is directed to a novel pre-training technique CMLM for unsupervised sentence representation learning on unlabeled corpora (e.g., either in monolingual or multilingual).

The proposed techniques and resulting models have been demonstrated to have or facilitate state-of-the-art performance at various language tasks. As one example, an example English CMLM model achieves state-of-the-art performance on the SentEval dataset, even outperforming models learned using (semi-)supervised signals. SentEval is a collection of evaluations sets for multiple independent tasks.

In addition, as a fully unsupervised learning method, CMLM can be conveniently extended to a broad range of languages and domains, and even other data modalities (e.g., images in combination with MLM). Example experiments which are described below demonstrate that a multilingual CMLM model co-trained with bitext retrieval (BR) and natural language inference (NLI) tasks outperforms the previous state-of-the-art multilingual models by a large margin. One example approach which has been demonstrated to be high-performing is multitask training with CMLM followed by a cross-lingual NLI fine-tuning for multilingual representation. In another example, models training on English-language Amazon review data using the proposed multilingual vectors exhibit strong multilingual transfer performance on translations of the Amazon review evaluation data to French, German and Japanese, outperforming existing multilingual sentence embedding models by >5% for non-English languages and by >2% on the original English data.

The present disclosure also explores the same language bias of the learned representations and proposes a principal component based approach to remove the language identifying information from the representation while still retaining sentence semantics. More particularly, language agnostic representations require semantically similar cross-lingual pairs to be closer in representation space than unrelated same-language pairs. While some language segment embeddings may have a bias for same language sentences, the present disclosure demonstrates that removing the first few principal components of the embeddings eliminates the self-language bias. Thus, another example aspect of the present disclosure is directed to a principal components-based method to remove same language bias.

The systems and methods of the present disclosure provide a number of technical effects and benefits. As one example technical effect, the present disclosure provides an efficient and unsupervised technique for learning a model which can generate language segment embeddings. Because the approach is unsupervised, there is no need for time-consuming production of supervised labels.

As another example technical effect, the present disclosure improves model performance and therefore the performance of a computer itself. In particular, improved performance can be achieved on a number of language tasks including, as examples, sentence retrieval, sentence classification, translation retrieval/ranking, sentiment analysis, conversational response generation (e.g., for "chatbots"), and/or other tasks.

The systems and methods described herein can be performed at a user's device or can be offered as a service (e.g., by a cloud-based machine learning as a service platform). For example, a user can interact with a platform to receive performance of the proposed techniques as a service.

With reference now to the Figures, example embodiments of the present disclosure will be discussed in further detail.

2. Example Conditional Masked Language Modeling

This section introduces Conditional Masked Language Modeling (CMLM) as a novel architecture for combining next sentence prediction with MLM training. By "conditional", it is meant that the MLM task for one language segment depends on (e.g., is generated on the basis of) the encoded segment-level representation(s) of one or more other language segments (e.g., adjacent sentence(s)).

While existing MLMs like BERT (Bidirectional Encoder Representations from Transformers) include next sentence prediction tasks, they do so without any inductive bias to try to encode the meaning of a sentence within a single embedding vector. The present disclosure introduces a strong inductive bias for learning sentence embeddings by structuring the task as follows. Given a number of related language segments (e.g., a pair of ordered sentences), one or more first language segments are fed to an encoder that produces a segment-level contextual embedding. The embedding is then provided to an encoder that conditions on the segment-level embedding in order to better perform MLM prediction over another one of the language segments.

FIG. 1 illustrates an overview of the process as applied to an example which includes two consecutive language segments 202 and 204. The process includes processing the first language segment 202 with a first machine-learned language encoding model 206 (e.g., a transformer or other self-attention-based model) to generate a contextual language embedding 208.

The illustrated process also includes generating a masked version 210 of a subject language segment 204, wherein the masked version 210 of the subject language segment 204 includes one or more masked tokens.

The illustrated process includes combining the contextual language embedding 208 and the masked version 210 of the subject language segment to obtain a conditioned input 211 and processing the conditioned input 211 with a second machine-learned language encoding model 212 (e.g., a transformer or other self-attention-based model) to generate one or more predictions 214 respectively for the one or more masked tokens.

The training process includes modifying one or more values of one or more parameters of one or both of the first machine-learned language encoding model 206 and/or the second language encoding model 212 based on a loss function that compares the one or more predictions 214 respectively with the one or more masked tokens of the masked version 210 of the subject language segment 204. As one example, the first machine-learned language encoding model and the second machine-learned language encoding model can be end-to-end jointly trained based on the loss function.

In some implementations, the first machine-learned language encoding model and the second machine-learned language encoding model share one or more values for one or more parameters. In some implementations, one or both of the first machine-learned language encoding model 206 and/or the second language encoding model 212 can be further trained with a bitext retrieval loss function for a bitext retrieval task. In some implementations, one or both of the first machine-learned language encoding model 206 and/or the second language encoding model 212 can be further finetuned with a natural language inference loss function for a premise segment and hypothesis segment that are in different languages.

In some implementations, for example the illustrated example in FIG. 1, each of the language segments 202 and 204 can include one or more sentences or sentence fragments.

In some implementations, one or both of the first machine-learned language encoding model 206 and the second machine-learned language encoding model 212 are or include a model that leverages self-attention, such as, for example a transformer model.

In some implementations, combining the contextual language embedding 208 and the masked version 210 of the subject language segment to obtain the conditioned input 211 can include generating a masked input embedding for the masked version 210 of the subject language segment and concatenating the contextual language embedding 208 and the masked input embedding to generate the conditioned input 211.

Although FIG. 1 illustrates two consecutive sentences, the one or more first language segments 202 can appear prior to the subject language segment 204 within a text source, subsequent to the subject language segment 204 within the text source, and/or both prior and subsequent to the subject language segment 204 within the text source.

In some implementations, the one or more first language segments 202 can include a plurality of first language segments. In some of such implementations, generating the contextual language embedding 208 can includes: individually processing each of the plurality of first language segments 202 with the first machine-learned language encoding model 206 to generate a respective individual language embedding and combining the respective individual language embeddings for the plurality of first language segments to generate the contextual language embedding 208.

In some implementations, at least one of the one or more first language segments 202 is expressed in a first natural language and the subject language segment 204 is expressed in a second natural language that is different from the first natural language. In some of such implementations, the segments 202 and 204 can be related segments in different languages or the same segment but expressed in two different languages. Thus, in some implementations, the method encourages the embedding representations to be similar for sentences that mean the same thing but that are written in different languages.

Figure 2:
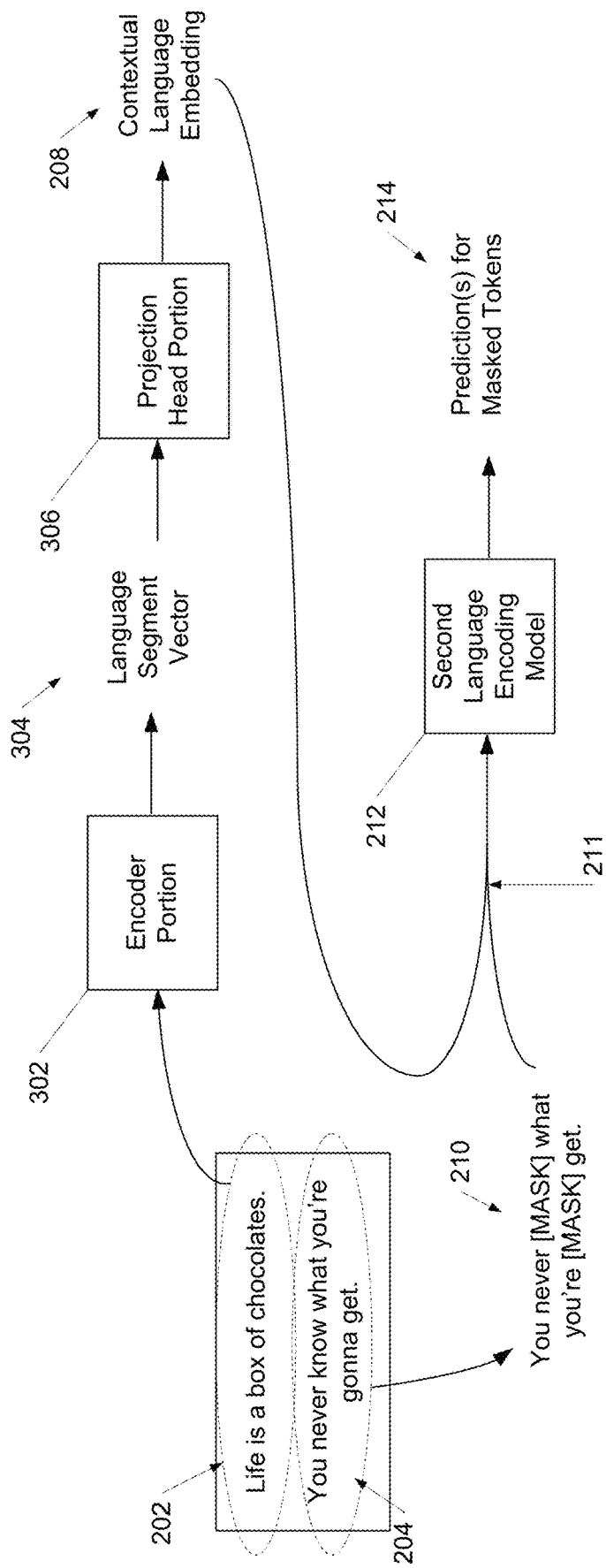
FIG. 2 depicts a block diagram of an example process for learning universal language segment representations with conditional masked language models according to example embodiments of the present disclosure.

FIG. 2 shows another example implementation in more detail. In FIG. 2, the first language segment 202 is processed with a self-attention-based encoder portion 302 of the first machine-learned language encoding model to obtain a language segment vector 304. The language segment vector 304 is processed with a projection head portion 306 of the first machine-learned language encoding model to obtain the contextual language embedding 208. In some implementations, the projection head portion 306 of the first machine-learned language encoding model is a neural network.

To describe a specific example implementation with mathematical notation and reference to FIG. 2 (which is more general than the following specific example), a first sentence $s_1$ can be tokenized and input to an encoder and a sentence vector $v \in \mathbb{R}^d$ can be computed from the sequence outputs by average pooling. One can equivalently choose other pooling methods, such as max pooling or use the vector output corresponding to a special token position such as the [CLS] token. The sentence vector v can then be projected into N spaces with one of the projections being the identity mapping, i.e. $v_p = P(v) \in \mathbb{R}^{d \times N}$. For example, a three-layer neural network can be used as the projection head P(•). The second sentence $s_2$ can then be masked following the procedure described in the original BERT paper, including random replacement and the use of unchanged tokens. The second encoder can optionally share the same weights with the encoder used to embed $s_1$. Tokens in the masked version of $s_2$ can be converted into word vectors and concatenated with $v_p$. The concatenated representations can be provided to the encoder to predict the masked tokens in $s_2$. At inference time, the first encoding model can be kept and deployed and the subsequent projection head can be discarded. Thus, whereas BERT is pre-trained on masked sentences, and then applied to unmasked sentences, the encoder in the present disclosure can be trained on the data that matches what it sees at inference time. Section 5.2 explores various different configurations of CMLM, including the number of projection spaces, and how the projected vectors are connected to the embeddings of the second sentence.

Figure 3:
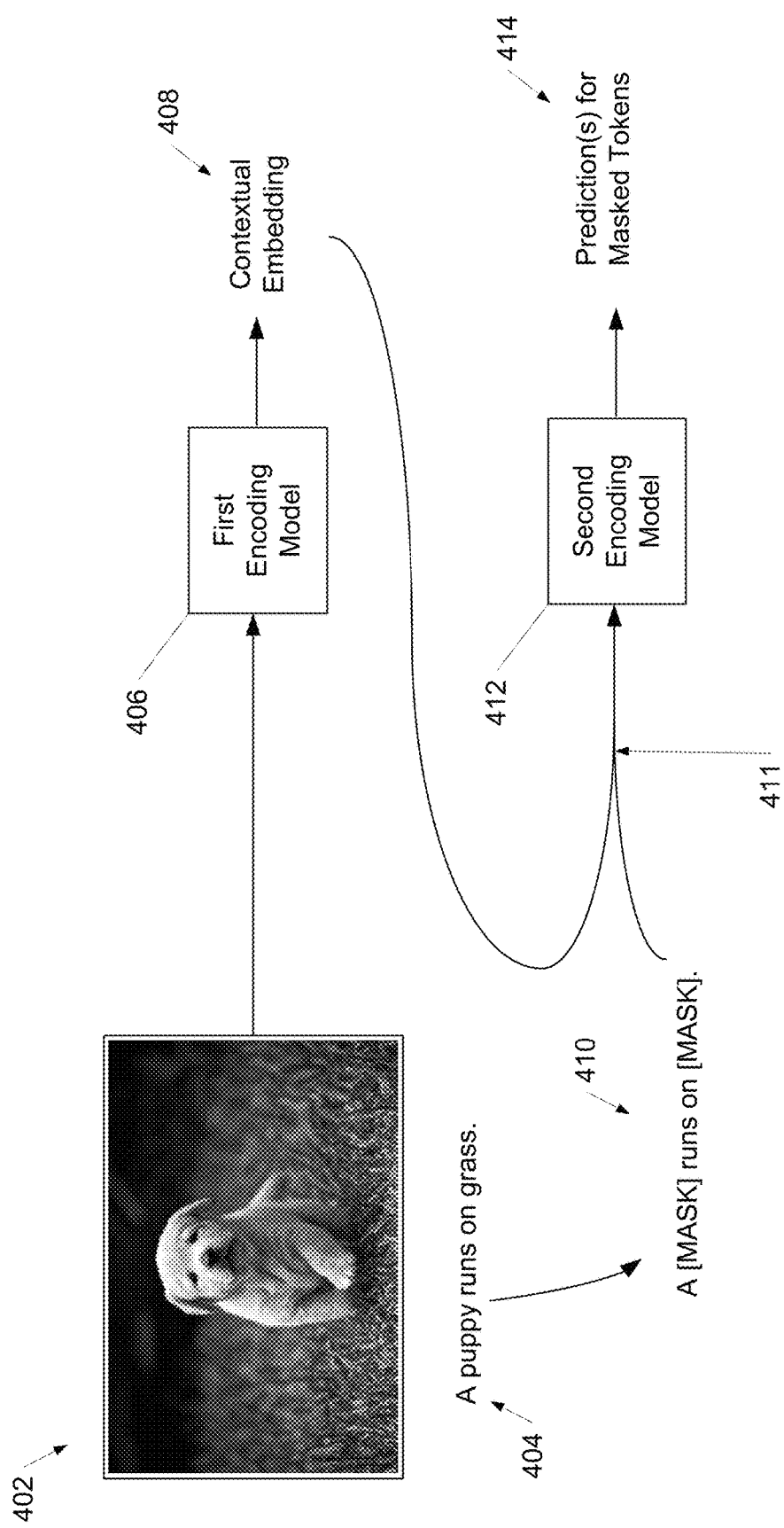
FIG. 3 depicts a block diagram of an example process for learning context representations with conditional masked language models according to example embodiments of the present disclosure.

FIG. 3 shows another example implementation which can be applied to condition a language model on non-linguistic context data (e.g., image data, etc.). The process includes processing a set of context data 402 with a first machine-learned encoding model 406 (e.g., a transformer or other self-attention-based model and/or a convolutional neural network) to generate a contextual embedding 408. In the illustrated example, the context data 402 is an image and the subject language segment 404 is a caption for the image.

The illustrated process also includes generating a masked version 410 of the subject language segment 404, wherein the masked version 410 of the subject language segment 404 includes one or more masked tokens.

The illustrated process includes combining the contextual embedding 408 and the masked version 410 of the subject language segment to obtain a conditioned input 411 and processing the conditioned input 411 with a second machine-learned encoding model 412 (e.g., a transformer or other self-attention-based model) to generate one or more predictions 414 respectively for the one or more masked tokens.

The training process includes modifying one or more values of one or more parameters of one or both of the first machine-learned encoding model 408 and/or the second encoding model 412 based on a loss function that compares the one or more predictions 414 respectively with the one or more masked tokens of the masked version 410 of the subject language segment 404. As one example, the first machine-learned encoding model and the second machine-learned encoding model can be end-to-end jointly trained based on the loss function.

Figure 4:
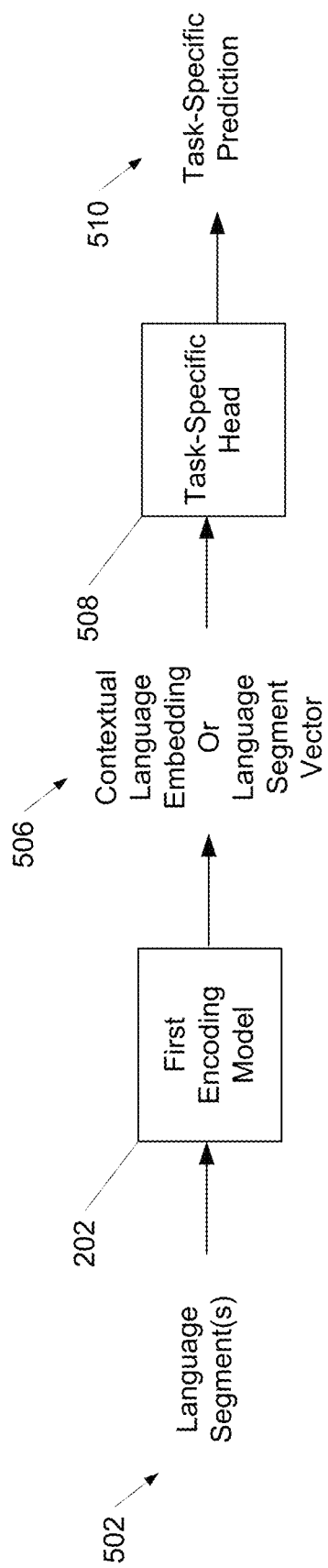
FIG. 4 depicts a block diagram of an example process for using a learned encoding model according to example embodiments of the present disclosure.

FIG. 4 shows one example use of the first encoder model 202 after performance of the training scheme shown in FIG. 1 or 2. In particular, one or more additional language segments 502 can be input into the first encoding model 202. The first encoding model 202 can be the full encoding model or can be only the encoding portion (e.g., shown as portion 302 in FIG. 2). In response to the language segments 502, the first encoding model 202 can generate a contextual language embedding or a language segment vector 506. The contextual language embedding or language segment vector 506 can be input into a task-specific head 508 (e.g., which can be a neural network). The task-specific head 508 can generate a task-specific prediction 510. Example task-specific predictions 510 include, sentiment analysis, question-type, product reviews, subjectivity/objectivity, entailment, sentence retrieval, sentence classification, translation retrieval/ranking, bi-text mining, conversational response generation or selection, or response ranking (e.g., for "chatbots"), and/or other tasks.

The concept illustrated in FIG. 4 can be generalized to making task-specific predictions for any model learned using the techniques described herein. For example, encoding model 406 of FIG. 3 can be used (e.g., in the framework shown in FIG. 4) to generate task-specific predictions for non-linguistic inputs (e.g., images).

The following sections describe example experiments conducted with example implementations of the present disclosure.

3. Learning English Sentence Representations with CMLM

For training English sentence encoders with CMLM, example experiments use three Common Crawl dumps (additional data is likely to provide even better results). The data are filtered by a classifier which detects whether a sentence belongs to the main content of the web page or not. The experiments use WordPiece tokenization and the vocabulary is the same as public English uncased BERT. In order to make the CMLM task more challenging and enable the model to learn bidirectional information, for two consecutive sequences $s_1$ and $s_2$, the experiments swap their order for 50% of the time. The length of $s_1$ and $s_2$ are set to be 256 tokens. The number of masked tokens in $s_2$ are 80 (31.3%), moderately higher than classical BERT. This change in the ratio of masked tokens is to make the task more challenging, due to the fact that in CMLM, language modeling has access to extra information from adjacent sentences. The experiments train with batch size of 2048 for 1 million steps. The optimizer is LAMB (a Layer-wise Adaptive Moments optimizer for Batch training) with learning rate of $10^{-3}$, $\beta_1=0.9$, $\beta_2=0.999$, warm-up in the first 10,000 steps and linear decay afterwards. The experiments explore two transformer configurations, base and large, same as in the original BERT paper. The number of projections N=15.

3.1 Example Evaluation

Example experiments evaluate the sentence representations on the following tasks: (1) classification: MR (movie reviews [*Seeing stars: Exploiting class relationships for sentiment categorization with respect to rating scales*, Pang & Lee (2005)]), binary SST (sentiment analysis, [*Recursive Deep Models for Semantic Compositionality Over a Sentiment Treebank*, Socher et al. (2013)]), TREC (question-type, [*Building a Question Answering Test Collection*, Voorhees & Tice (2000)]), CR (product reviews, [*Mining and Summarizing Customer Reviews*, Hu & Liu (2004)]), SUBJ (subjectivity/objectivity, [*A Sentimental Education: Sentiment Analysis Using Subjectivity Summarization Based on Minimum Cuts*, Pang & Lee (2004)]). (2) Entailment: SNLI [*A large annotated corpus for learning natural language inference*, Bowman et al. (2005)] and SICK dataset for entailment (SICK-E, [*A SICK cure for the evaluation of compositional distributional semantic models*, Marelli et al. (2014)]). The evaluation is done using SentEval [*SentEval: An Evaluation Toolkit for Universal Sentence Representations*, Conneau & Kiela (2008)] which is a prevailing evaluation toolkit for sentence embeddings. The classifier for the downstream is logistic regression. For each task, the encoder and embeddings are fixed and only downstream neural structures are trained.

The baseline sentence embedding models include Skip Thought [*Skip-Thought Vectors*, Kiros et al. (2015)], InferSent [*Supervised Learning of Universal Sentence Representations from Natural Language Inference Data*, Conneau et al. (2017)], USE [*Universal Sentence Encoder*, Cer et al (2018)], English BERT using standard pre-trained models from TensorFlow Hub website ([*BERT: Pre-training of Deep Bidirectional Transformers for Language Understanding*, Devlin et al. (2019)], and SentBert [*Sentence-BERT: Sentence Embeddings using Siamese BERT-Networks*, Reimers & Gurevych (2019)]. To address the effects of different training processes and data, the experiments generate training data for MLM from the same Common Crawl Corpora and train standard BERT models (English BERT base/large (CC)). The representations for BERT are computed by averaging pooling of the sequence outputs (other options include the [CLS] vector and max pooling).

3.2 Example Results

Evaluation results are presented in Table 1. CMLM outperforms existing models overall, besting MLM (both English BERT and English BERT (CC)) using both base and large configurations. The closest competing model is SentBERT, which uses supervised NLI data rather than a purely unsupervised approach. Interestingly, CMLM outperforms SentBERT on the SICK-E NLI task.

TABLE 1

Transfer learning test set results on SentEval for English models. Baseline models include BERT-based (BERT and SentBERT) and non-BERT models (SkipThought, InferSent and USE).

| Model | MR | CR | SUBJ | MPQA | SST | TREC | MRPC | SICK-E | Avg. |
|---|---|---|---|---|---|---|---|---|---|
| SkipThought | 76.5 | 80.1 | 93.6 | 87.1 | 82.0 | 92.2 | 73.0 | 82.3 | 83.4 |
| InferSent | 81.6 | 86.5 | 92.5 | 90.4 | 84.2 | 88.2 | 75.8 | 80.3 | 84.9 |
| USE | 80.1 | 85.2 | 94.0 | 86.7 | 86.4 | 93.2 | 70.1 | 82.4 | 84.8 |
| English BERT base | 81.6 | 87.4 | 95.2 | 87.8 | 85.8 | 90.6 | 71.1 | 79.3 | 84.8 |
| English BERT base (CC) | 82.5 | 88.5 | 95.6 | 87.3 | 88.0 | 91.4 | 72.0 | 79.3 | 85.4 |
| CMLM base (ours) | 83.6 | 89.9 | 96.2 | 89.3 | 88.5 | 91.0 | 69.7 | 82.3 | 86.3 |
| English BERT large | 84.3 | 88.9 | 95.7 | 86.8 | 88.9 | 91.4 | 71.8 | 75.7 | 85.4 |
| English BERT large (CC) | 85.4 | 89.0 | 95.7 | 86.9 | 90.5 | 91.2 | 75.5 | 74.3 | 86.0 |
| SentBERT (MNLI + SNLI) | 84.8 | 90.0 | 94.5 | 90.3 | 90.7 | 87.4 | 76.0 | 74.9 | 86.1 |
| CMLM large (ours) | 85.6 | 89.1 | 96.6 | 89.3 | 91.4 | 92.4 | 70.0 | 82.2 | 87.1 |

4. Learning Multilingual Sentence Representations with CMLM

As a fully unsupervised method, CMLM can be conveniently extended to multilingual modeling even for less well-resourced languages. Learning good multilingual sentence representations is more challenging than learning monolingual ones, especially when attempting to capture the semantic alignment between different languages. As CMLM does not explicitly address cross-lingual alignment, example experiments explore several modeling approaches besides CMLM: (1) Co-training CMLM with a bitext retrieval task; (2) Fine-tuning with cross-lingual NLI data.

4.1 Multilingual CMLM

The experiments follow the same configuration used to learn English sentence representations with CMLM, but extend the training data to include more languages. Results below will show that CMLM again exhibits competitive performance as a general technique to learn from large scale unlabeled corpora.

4.2 Multitask Training with CMLM and Bitext Retrieval

Besides the monolingual pretraining data, the experiments collect a dataset of bilingual translation pairs $\{(s_i, t_i)\}$ using a bitext mining system [*Language-agnostic BERT Sentence Embedding*, Feng et al. (2020)]. The source sentences $\{s_i\}$ are in English and the target sentences $\{t_i\}$ covers over 100 languages. The experiments build a retrieval task with the translation parallel data, identifying the corresponding translation of the input sentence from candidates in the same batch. Concretely, incorporating Additive Margin Softmax [*Improving Multilingual Sentence Embedding using Bi-directional Dual Encoder with Additive Margin Softmax*, Yang et al. (2019b)], the experiments compute the bitext retrieval loss $\mathcal{L}_{br}^{s}$ for the source sentences as:

$$\mathcal{L}_{br}^{s} = -\frac{1}{B}\sum_{i=1}^{B}\frac{e^{\phi(s_i,t_i)-m}}{e^{\phi(s_i,t_i)-m}+\sum_{j=1,j\neq i}^{B}e^{\phi(s_i,t_j)}} \quad (1)$$

Above $\phi(1_s^{(i)}, 1_t^{(i)})$ denotes the inner products of sentence vectors of $1_s^{(i)}$ and $1_t^{(i)}$ (embedded by the transformer encoder); m and B denotes the additive margin and the batch size respectively. Note the way to generate sentence embeddings is the same as in CMLM. We can compute the bitext retrieval loss for the target sentences $\mathcal{L}_{br}^{t}$ by normalizing over source sentences, rather than target sentences, in the denominator (e.g., by swapping the i and j subscripts in the last term of the denominator). The final bitext retrieval loss $\mathcal{L}_{br}$ is given as $\mathcal{L}_{br} = \mathcal{L}_{br}^{s} + \mathcal{L}_{br}^{t}$.

There are several ways to incorporate the monolingual CMLM task and bitext retrieval (BR). The experiments explore the following multistage and multitask pretraining strategies:

S1: CMLM→BR: Train with CMLM in the first stage and then train with on BR;

S2: CMLM+BR: Train with both CMLM and BR from the start;

S3: CMLM→CMLM+BR: Train with only CMLM in the first stage and then with both tasks.

When training with both CMLM and BR, the optimization loss is a weighted sum of the language modeling and the retrieval loss $\mathcal{L}_{br}$, i.e. $\mathcal{L} = \mathcal{L}_{CMLM} + \alpha \mathcal{L}_{br}$. The experiments empirically demonstrate that α=0.2 works well. As shown in Table 3, S3 is found to be the most effective. Unless otherwise denoted, the models trained with CMLM and BR follow S3. The experiments also demonstrate that given a pre-trained transformer encoder, e.g. mBERT, the quality of sentence representations can be improved by finetuning the transformer encoder with CMLM and BR. As shown in Table 2 and Table 3, the improvements between "mBERT" and "f-mBERT" (finetuned mBERT) are significant.

4.3 Finetuning with Cross-Lingual Natural Language Inference

Finetuning with NLI data has proved to be an effective method to improve the quality of embeddings for English models. Example experiments extend this to the multilingual domain. Given a premise sentence u and a hypothesis sentence v, the experiments train a 3-way classifier on the concatenation of [u, v, |u−v|, u*v]. Weights of transformer encoders are also updated in the finetuning process. Different from previous work also using multilingual NLI data

[*Multilingual Universal Sentence Encoder for Semantic Retrieval*, Yang et al. (2019a)], the premise u and hypothesis v here are in different languages. The cross-lingual NLI data are generated by translating Multi-Genre NLI Corpus [*A Broad-Coverage Challenge Corpus for Sentence Understanding through Inference*, Williams et al. (2018)] into 14 languages using an industrial translation Application Programming Interface (API).

4.4 Example Configurations

Monolingual training data for CMLM are generated from 3 versions of Common Crawl data in 113 languages. The data cleaning and filtering is the same as the English-only ones. A new cased vocabulary is built from all data sources using the WordPiece vocabulary generation library from Tensorflow Text. The language smoothing exponent from the vocab generation tool is set to 0.3, as the distribution of data size for each language is imbalanced. The final vocabulary size is 501,153. The number of projections N=10 and the batch size B=2048. For CMLM only pretraining, the number of steps is 2 million. In multitask learning, for S1 and S3, the first stage is of 1.5 million and the second stage is of 1 million steps; for S2, number of training steps is 2 million. The transformer encoder uses the BERT base configuration. Initial learning rate and optimizer chosen are the same as the English models.

4.5 Example Evaluations 4.5.1 XEVAL: Multilingual Benchmarks for Sentence Representations Evaluation Evaluations in previous multilingual literature focused on the cross-lingual transfer learning ability from English to other languages. However, this evaluation protocol that treats English as the "anchor" does not equally assess the quality of non-English sentence representations with English ones. In order to address the issue, example experiments prepare a new benchmark for multilingual sentence vectors, XEVAL, by translating SentEval (English) to other 14 languages with an industrial translation API.

Results of models trained with monolingual data are shown in Table 2. Baseline models include mBERT [*BERT: Pre-training of Deep Bidirectional Transformers for Language Understanding*, Devlin et al. (2019)], XLM-R [*Unsupervised Cross-Lingual Representation Learning*, Ruder et al. (2019)] and a transformer encoder trained with MLM on the same Common Crawl data (MLM(CC), again this is to control the effects of training data). The method to produce sentence representations for mBERT and XLM-R is chosen to be averaging pooling after exploring options including [CLS] representations and max pooling. The multilingual model CMLM on monolingual data outperform all baselines in 12 out of 15 languages and the average performance.

TABLE 2

Performance (accuracy) of multilingual models trained with monolingual data on XEVAL. Highest numbers are highlighted in bold.

| Model | ar | bg | de | el | en | es | fr | hi | ru | sw | th | tr | ur | vi | zh | Avg. |
|---|---|---|---|---|---|---|---|---|---|---|---|---|---|---|---|---|
| mBERT | 76.3 | 76.8 | 78.3 | 76.4 | 80.6 | 79.5 | 78.7 | 75.9 | 77.7 | 71.0 | 74.2 | 75.7 | 71.7 | 79.3 | 79.5 | 76.7 |
| MLM (CC) | 79.5 | 79.8 | 82.1 | 80.0 | 84.5 | 82.6 | 83.0 | 79.6 | 81.8 | 69.6 | 77.2 | 79.4 | 74.9 | 81.7 | 81.3 | 79.8 |
| XLM-R | 78.4 | 78.5 | 76.8 | 78.6 | 83.1 | 81.8 | 80.6 | 77.5 | 80.6 | 71.2 | 78.0 | 79.7 | 77.0 | 80.6 | 81.1 | 77.5 |
| CMLM | 79.8 | 80.2 | 82.4 | 80.2 | 84.9 | 82.9 | 83.3 | 79.8 | 82.0 | 71.3 | 77.4 | 79.9 | 77.4 | 81.5 | 81.7 | 80.4 |

Results of models trained with cross-lingual data are presented in Table 3. Baseline models for comparison include LASER ([*Massively Multilingual Sentence Embeddings for Zero-Shot Cross-Lingual Transfer and Beyond*, Artetxe & Schwenk (2019)], trained with parallel data) and multilingual USE ([*Multilingual Universal Sentence Encoder for Semantic Retrieval*, Yang et al. (2019a)], trained with cross-lingual NLI). The proposed model (S3) outperforms LASER in 13 out of 15 languages. Notably, finetuning with NLI in the cross-lingual way produces significant improvement (S3+NLI vs. S3) and it also outperforms mUSE by significant margins. Note mUSE only supports 16 languages, the best CMLM model is still significantly better if only considering the mUSE supported languages (underline in table 2 indicates the unsupported languages by mUSE). Multitask learning with CMLM and BR can also be used to increase the performance of pretrained encoders, e.g. mBERT, mBERT trained with CMLM and BR (f-mBERT) has a significant improvement upon mBERT.

TABLE 3

Performance (accuracy) of models trained with cross-lingual data on XEVAL. mUSE only supports 16 languages, underline indicates the language is not supported by mUSE. We test with multiple strategies for multitask pretraining: [S1]: CMLM → BR; [S2]: CMLM + BR; [S3]: CMLM → CMLM + BR. [f-mBERT] denotes finetuning mBERT with CMLM and BR.

| Model | ar | bg | de | el | en | es | fr | hi | ru | sw | th | tr | ur | vi | zh | Avg. |
|---|---|---|---|---|---|---|---|---|---|---|---|---|---|---|---|---|
| LASER | 82.5 | 81.4 | 82.1 | 78.0 | 83.0 | 81.3 | 81.3 | 78.7 | 82.5 | 75.7 | 80.5 | 82.2 | 77.0 | 81.9 | 82.4 | 80.7 |
| mUSE | 81.0 | <u>74.5</u> | 82.2 | <u>65.4</u> | 83.8 | 83.2 | 82.6 | <u>62.4</u> | 82.3 | <u>67.3</u> | 82.0 | 80.9 | <u>68.1</u> | <u>67.6</u> | 82.1 | 76.4 |
| S1 | 78.3 | 78.9 | 79.3 | 78.1 | 81.0 | 78.7 | 79.5 | 78.0 | 79.0 | 76.6 | 77.8 | 78.6 | 77.7 | 79.0 | 78.6 | 78.6 |
| S2 | 80.4 | 81.8 | 81.6 | 81.1 | 83.4 | 83.0 | 82.6 | 80.7 | 83.1 | 76.5 | 79.6 | 81.5 | 80.2 | 82.0 | 83.1 | 81.4 |
| S3 | 81.6 | 83.0 | 83.2 | 81.8 | 85.0 | 84.0 | 84.5 | 81.6 | 84.0 | 78.6 | 80.8 | 81.5 | 80.6 | 82.5 | 83.1 | 82.1 |
| S3 + NLI | 83.2 | 83.4 | 85.1 | 83.3 | 86.8 | 85.6 | 85.5 | 82.6 | 85.4 | 78.9 | 82.2 | 83.6 | 81.9 | 84.2 | 84.1 | 83.8 |
| mBERT | 76.3 | 76.8 | 78.3 | 76.4 | 80.6 | 79.5 | 78.7 | 75.9 | 77.7 | 71.0 | 74.2 | 75.7 | 71.7 | 79.3 | 79.5 | 76.7 |
| f-mBERT | 77.5 | 78.7 | 79.4 | 77.3 | 77.3 | 80.0 | 80.4 | 77.4 | 79.2 | 74.1 | 77.3 | 77.2 | 77.3 | 79.8 | 80.6 | 78.3 |

4.5.2 Amazon Reviews

Example experiments also conduct a zero-shot transfer learning evaluation on Amazon reviews dataset [*Cross-Language Text Classification using Structural Correspondence Learning*, Prettenhofer & Stein (2010)]. Following [*Learning Cross-Lingual Sentence Representations via a Multi-task Dual-Encoder Model*, Chidambaram et al. (2019)], the original dataset is converted to a classification benchmark by treating reviews with strictly more than 3 stars as positive and negative otherwise. The experiments split 6000 English reviews in the original training set into 90% for training and 10% for development. The two-way classifier, upon the concatenation of [u, v, |u−v|, u*v], is trained on the English training set and then evaluated on English, French, German and Japanese test sets (each has 6000 examples). Note the same multilingual encoder and classifier are used for all the evaluations. The experiments also explore whether the encoder weights should be frozen or not during training. As presented in Table 4, CMLM alone has already outperformed baseline models. Training with BR and cross-lingual NLI finetuning further boost the performance.

TABLE 4

Classification accuracy on the Amazon Reviews dataset. The experiments examine the zero-shot cross-lingual ability of multilingual models. We explore both freezing/updating the weights of the multilingual encoder during training on English data.

| Models | English | French | German | Japanese |
|---|---|---|---|---|
| *Encoder parameters are frozen during finetuning* | | | | |
| [Eriguchi et al. (2018)] | 83.2 | 81.3 | — | — |
| [Chidambaram et al. (2019)] en-fr | 87.4 | 82.3 | — | — |
| [Chidambaram et al. (2019)] en-de | 87.1 | — | 81.0 | — |
| mBERT | 80.0 | 73.1 | 78.4 | 71.7 |
| CMLM | 88.7 | 87.9 | 87.8 | 70.8 |
| CMLM + BR | 87.6 | 87.2 | 85.6 | 72.0 |
| CMLM + BR + NLI | 89.2 | 87.8 | 86.7 | 71.9 |
| *Encoder parameters are trained during finetuning* | | | | |
| mBERT | 89.3 | 83.5 | 79.4 | 74.0 |
| CMLM | 93.0 | 90.2 | 90.9 | 74.0 |
| CMLM + BR | 92.8 | 91.2 | 90.2 | 76.0 |
| CMLM + BR + NLI | 93.0 | 91.2 | 90.5 | 76.3 |

5. Example Analysis

5.1 Language Agnostic Properties

Language Agnosticism has been a property of great interest for multilingual representations. However, there has not been a qualitative measurement or rigid definition for this property. Here it is proposed that "language agnostic" refers to the property that sentence representations are neutral w.r.t their language information. For example, two sentences with similar semantics should be close in embedding space whether they are of the same languages or not. Another case is that given one query sentence in language $l_1$ and two candidate sentences with the identical meanings (different from the query sentence) in languages $l_1$ and $l_2$, the $l_1$ input sentence should not be biased towards the $l_1$ candidate sentence.

Figure 5:
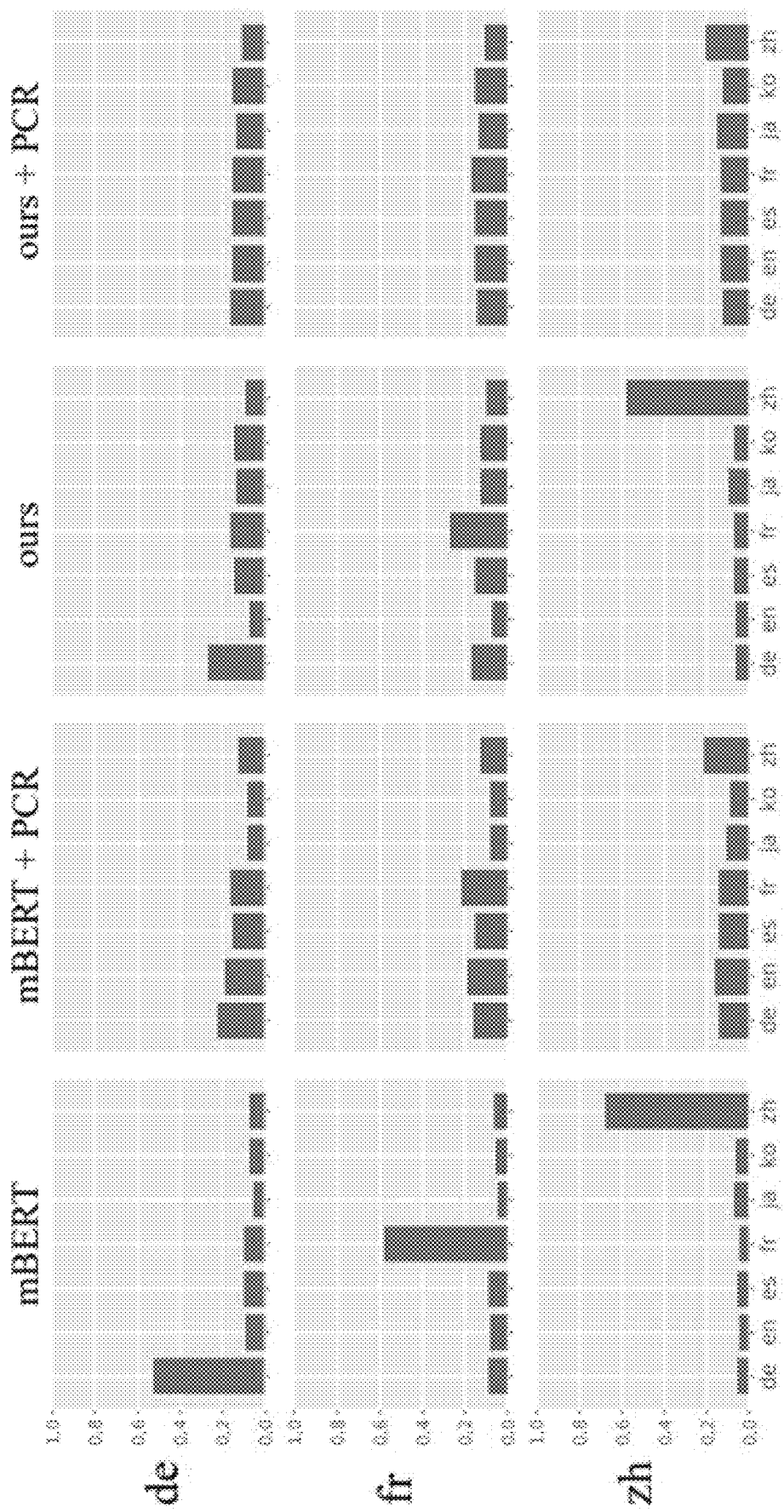
FIG. 5 depicts example experimental data for a language distribution of retrieved sentences according to example embodiments of the present disclosure.

To capture this intuition, example experiments convert the PAWS-X dataset [*PAWS-X: A Cross-lingual Adversarial Dataset for Paraphrase Identification*, Yang et al. (2019c)] to a retrieval task to measure the language agnostic property. Specifically, PAWS-X dataset consists of English sentences and their translations in other six languages (x-axis labels in FIG. 5). Given a query, the experiments inspect the language distribution of the retrieved sentences (by ranking cosine similarities). In FIG. 5, query sentences are in German, French and Chinese for each row. Representations of mBERT (first column) have a strong self language bias, i.e. sentences in the language matching the query are dominant. In contrast, the bias is much weaker in our model trained with CMLM and BR (the third column), probably due to the cross-lingual retrieval pretraining. The experiments demonstrate that removing the first principal component of each monolingual space from sentence representations effectively eliminate the self language bias.

As shown in the second and the fourth column in FIG. 5, with principal component removal (PCR), the language distribution is much more uniform. In particular, FIG. 5 shows the language distribution of retrieved sentences. The first and third columns are mBERT and the proposed models. The proposed model already in general has a more uniform distribution than mBERT. The second and fourth columns are mBERT and the proposed model with PCR.

Additional example experiments further explore PCR by experimenting on the Tatoeba dataset [*Massively Multilingual Sentence Embeddings for Zero-Shot Cross-Lingual Transfer and Beyond*, Artetxe & Schwenk (2019)]. Table 5 shows the retrieval accuracy of multilingual model with and w/o PCR. PCR increases the overall retrieval performance for both models. This suggests the first principal components in each monolingual space primarily encodes language identification information. In some cases, it may be beneficial to remove up to 1, 2, 3, or 4 principal components.

TABLE 5

Retrieval accuracy of multilingual representations model with and without principal component removal (PCR) on Tatoeba dataset.

|  | fra | cmn | spa | deu | rus | ita | tur | epo | por | hun | jpn | ukr | nld | Avg. |
|---|---|---|---|---|---|---|---|---|---|---|---|---|---|---|
| mBERT | 60.2 | 60.2 | 62.8 | 65.9 | 53.8 | 55.7 | 32.4 | 11.0 | 62.4 | 31.9 | 39.0 | 46.3 | 56.2 | 49.1 |
| mBERT + PCR | 59.9 | 64.3 | 61.7 | 67.5 | 57.4 | 56.2 | 33.3 | 18.6 | 64.4 | 36.5 | 42.3 | 48.5 | 61.1 | 51.6 |
| ours | 95.5 | 93.6 | 98.4 | 98.0 | 95.2 | 90.1 | 98.3 | 97.0 | 94.7 | 95.4 | 92.9 | 94.2 | 96.9 | 95.4 |
| ours + PCR | 95.7 | 94.1 | 98.3 | 98.5 | 94.9 | 89.9 | 98.5 | 97.0 | 94.7 | 95.8 | 93.4 | 93.8 | 97.2 | 95.6 |

Figure 6:
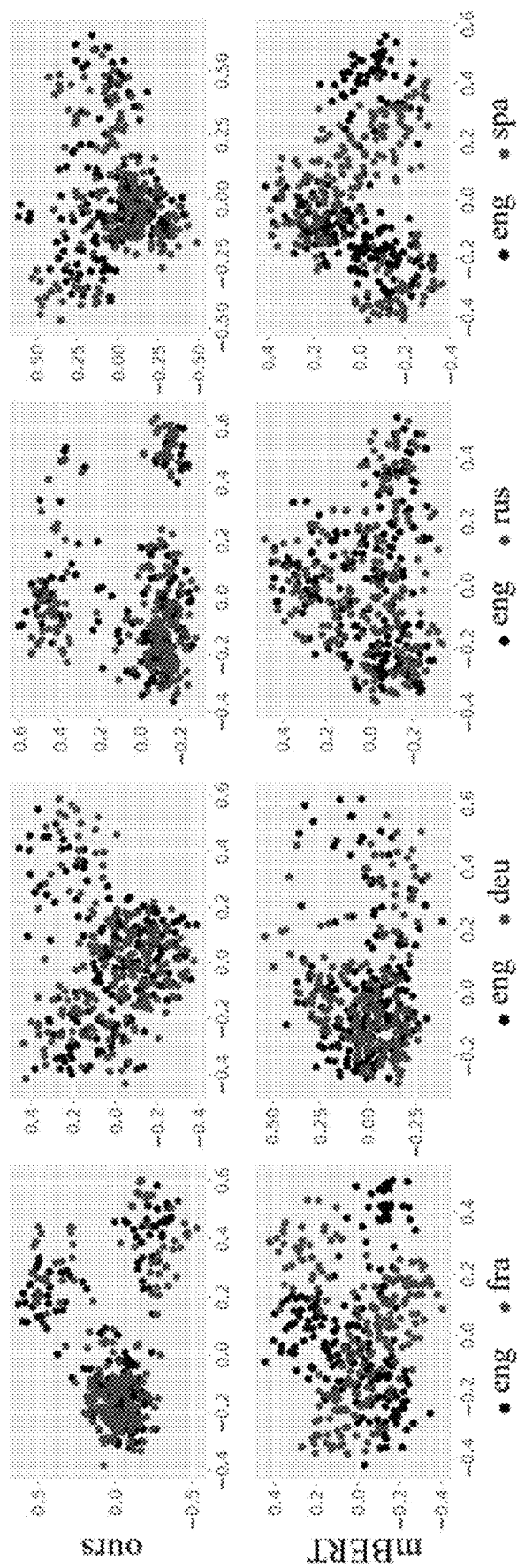
FIG. 6 depicts example experimental data for a sentence embeddings according to example embodiments of the present disclosure.

The sentence representations in Tatoeba dataset are also visualized in FIG. 6. In particular, FIG. 6 depicts visualizations of sentence embeddings in Tatoeba dataset in 2D. The target languages are all English and the source languages are French, German, Russian and Spanish from left to right columns. The first and second rows are the proposed model and mBERT respectively.

The proposed model (the first row) shows both weak and strong semantic alignment [*LAReQA: Language-agnostic answer retrieval from a multilingual pool*, Roy et al. (2020)]. Representations are close to others with similar semantics regardless of their languages (strong alignment), especially for French and Russian, where representations form several distinct clusters. Also representations from the same language tend to cluster (weak alignment). While representations from mBERT generally exhibit weak alignment.

5.2 Example Ablation Study

This section explores different configurations of CMLM, including the number of spaces in the projection N and CMLM architecture. As shown in Table 6, projecting the sentence vector into N=15 produces highest overall performance. The experiments also tested a modification to CMLM architecture. Besides the concatenation with token embeddings of $s_2$ before input to the transformer encoder, the projected vectors are also concatenated with the sequence outputs of $s_2$ for the masked token prediction. This version of architecture is denoted as "skip" and model performance actually becomes worse.

Note that the projected vector can also be used to produce the sentence representation $v_s$. For example, one way is to use the average of projected vectors, i.e. $v_s = 1/N \Sigma_i v_p^{(i)}$. Recall $v_p^{(i)}$ is the ith projection. This version is denoted as "proj" in Table 6. Sentence representations produced in this way still yield competitive performance, which further confirm the effectiveness of the projection. Average ("proj") is one possible way to produce the sentence representation, alternatives include max pooling, simply concatenating the projected vectors, or other schemes.

6. Example Devices and Systems

Figure 7A:
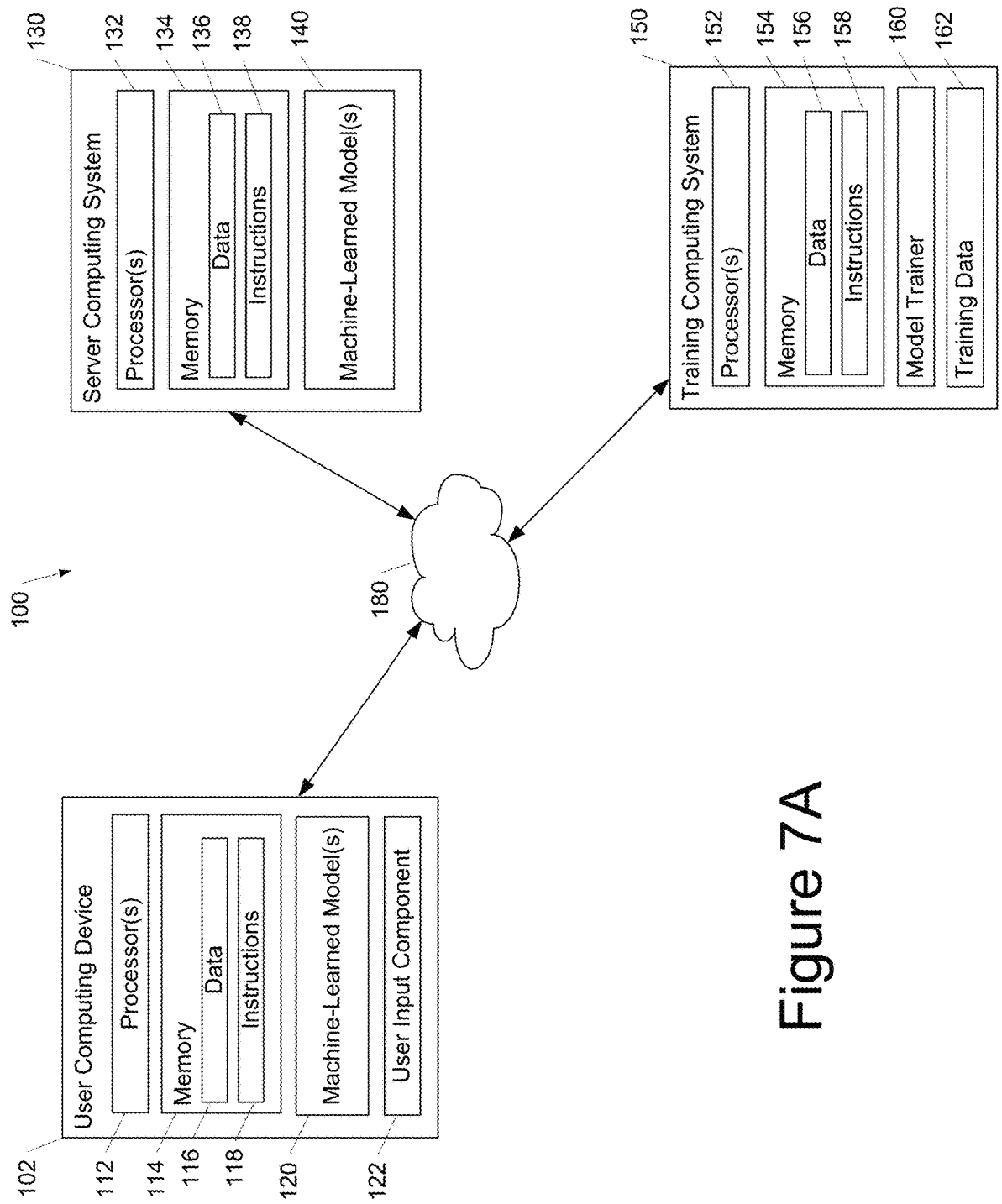
FIG. 7A depicts a block diagram of an example computing system according to example embodiments of the present disclosure.

FIG. 7A depicts a block diagram of an example computing system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convo-

TABLE 6

Ablation study of CMLM designs, including the number of projection spaces, architecture and sentence representations. The experiments are conducted on SentEval.

| Model | MR | CR | SUBJ | MPQA | SST | TREC | MRPC | SICK-E | Avg. |
|---|---|---|---|---|---|---|---|---|---|
| n = 1 | 82.3 | 89.7 | 95.8 | 88.8 | 87.6 | 90.4 | 71.5 | 80.8 | 85.8 |
| n = 5 | 83.7 | 90.0 | 95.5 | 89.0 | 89.4 | 86.6 | 69.5 | 79.3 | 85.4 |
| n = 10 | 83.4 | 89.0 | 96.1 | 88.9 | 88.2 | 90.2 | 68.5 | 79.7 | 85.4 |
| n = 15 | 83.6 | 89.9 | 96.2 | 89.3 | 88.5 | 91.0 | 69.7 | 82.3 | 86.3 |
| skip | 80.3 | 86.8 | 94.5 | 87.5 | 84.9 | 86.0 | 69.2 | 72.8 | 82.8 |
| proj | 82.6 | 89.7 | 96.0 | 87.3 | 87.5 | 89.2 | 70.5 | 81.7 | 85.6 | lutional neural networks or other forms of neural networks. Some example machine-learned models can leverage an attention mechanism such as self-attention. For example, some example machine-learned models can include multi-headed self-attention models (e.g., transformer models). Example machine-learned models 120 are discussed with reference to FIGS. 1-4.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120.

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 130 as a portion of a web service (e.g., a natural language processing service). Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Some example machine-learned models can leverage an attention mechanism such as self-attention. For example, some example machine-learned models can include multi-headed self-attention models (e.g., transformer models). Example neural networks include feed forward neural networks, deep neural networks, recurrent neural networks, and convolutional neural networks. Example models 140 are discussed with reference to FIGS. 1-4.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. The training data 162 can include, for example, unlabeled language sources.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g. one or more images or videos), the output comprises compressed visual data, and the task is a visual data compression task. In another example, the task may comprise generating an embedding for input data (e.g. input audio or visual data).

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 7A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 7B:
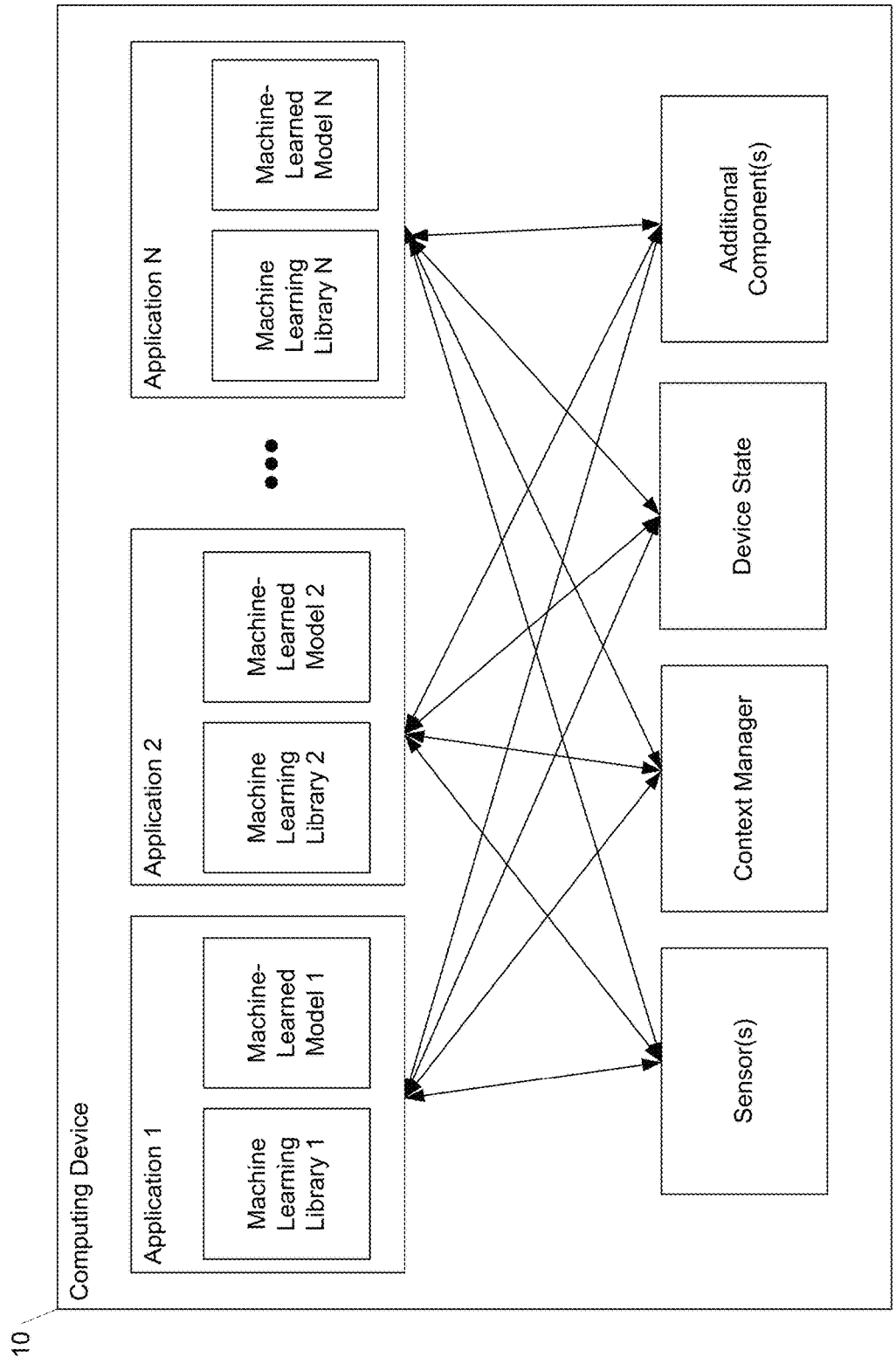
FIG. 7B depicts a block diagram of an example computing device according to example embodiments of the present disclosure.

FIG. 7B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 7B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 7C:
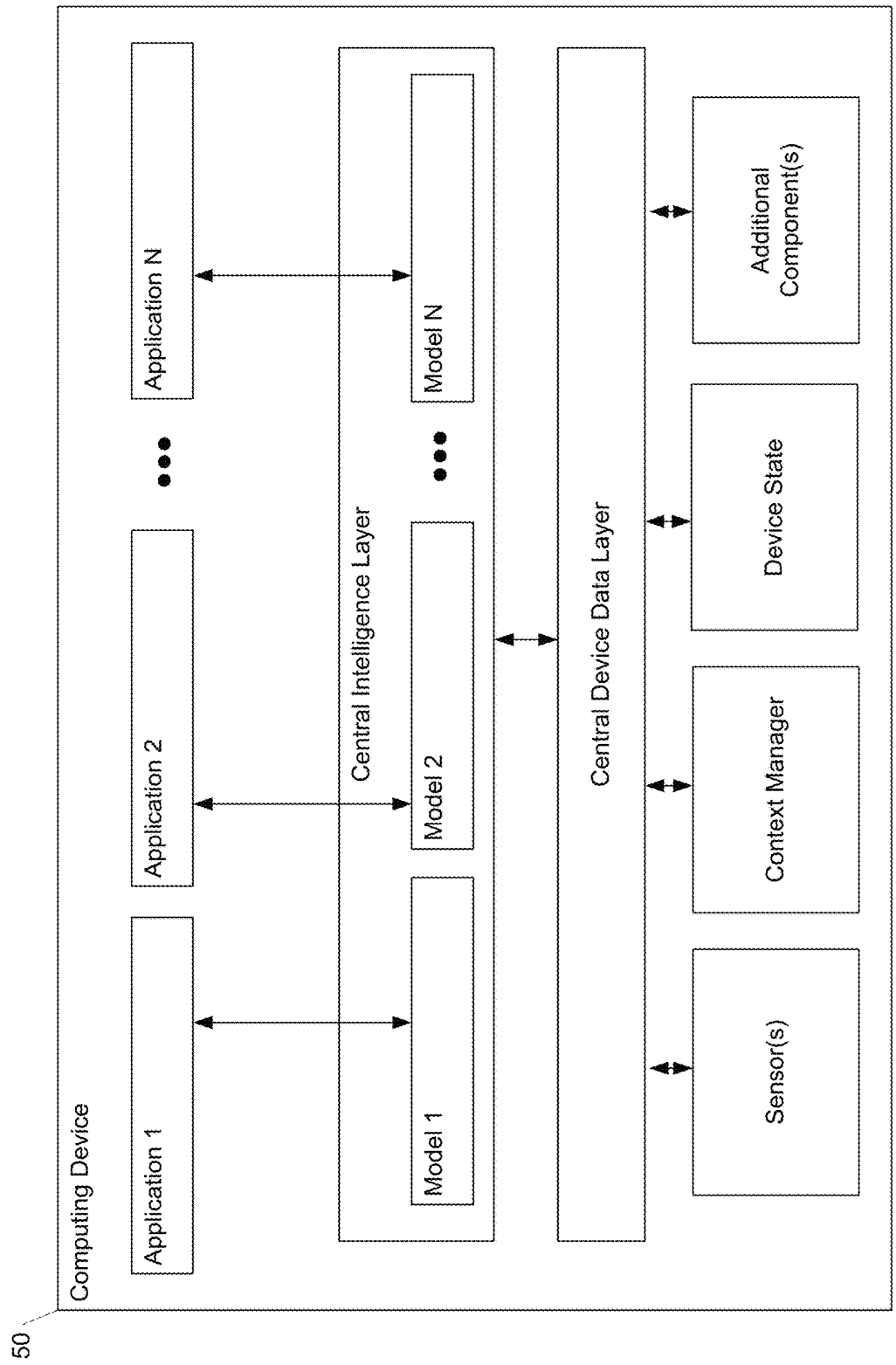
FIG. 7C depicts a block diagram of an example computing device according to example embodiments of the present disclosure.

FIG. 7C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 7C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 7C, the central device data layer can communicate with a number of other components of the computing device, such as, for example, one or more sensors, a context manager, a device state component, and/or additional components. In some implementations, the central device data layer can communicate with each device component using an API (e.g., a private API).

7. Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method to train machine learning models to produce representations for language segments containing multiple tokens, the method comprising:

processing, by a computing system comprising one or more computing devices, one or more first language segments of a plurality of language segments with a first machine-learned language encoding model to generate a segment-level contextual language embedding for the one or more first language segments, wherein each of the plurality of language segments comprises multiple tokens, generating, by the computing system, a masked version of a subject language segment of the plurality of language segments, wherein the masked version of the subject language segment comprises one or more masked tokens;

combining, by the computing system, the contextual language embedding and the masked version of the subject language segment to obtain a conditioned input;

processing, by the computing system, the conditioned input with a second machine-learned language encoding model to generate one or more predictions respectively for the one or more masked tokens; and modifying, by the computing system, one or more values of one or more parameters of at least the first machine-learned language encoding model based on a loss function that compares the one or more predictions respectively with the one or more masked tokens.

2. The computer-implemented method of claim 1, wherein each of the plurality of language segments comprises one or more sentences.

3. The computer-implemented method of claim 1, wherein processing, by the computing system, the one or more first language segments of the plurality of language segments with the first machine-learned language encoding model to generate the contextual language embedding comprises:

processing, by the computing system, the one or more first language segments of the plurality of language segments with a self-attention-based encoder portion of the first machine-learned language encoding model to obtain a language segment vector; and processing, by the computing system, the language segment vector with a projection head portion of the first machine-learned language encoding model to obtain the contextual language embedding.

4. The computer-implemented method of claim 3, wherein the projection head portion of the first machine-learned language encoding model comprises a neural network.

5. The computer-implemented method of claim 1, wherein one or both of the first machine-learned language encoding model and the second machine-learned language encoding model comprise a transformer model.

6. The computer-implemented method of claim 1, wherein combining, by the computing system, the contextual language embedding and the masked version of the subject language segment to obtain the conditioned input comprises:

generating, by the computing system, a masked input embedding for the masked version of the subject language segment; and concatenating, by the computing system, the contextual language embedding and the masked input embedding to generate the conditioned input.

7. The computer-implemented method of claim 1, wherein the one or more first language segments appear prior to the subject language segment within a text source, subsequent to the subject language segment within the text source, or both prior and subsequent to the subject language segment within the text source.

8. The computer-implemented method of claim 1, wherein modifying, by the computing system, one or more values of one or more parameters of at least the first machine-learned language encoding model based on the loss function that compares the one or more predictions respectively with the one or more masked tokens comprises jointly training, by the computing system, both the first machine-learned language encoding model and the second machine-learned language encoding model end-to-end based on the loss function.

9. The computer-implemented method of claim 1, wherein the first machine-learned language encoding model and the second machine-learned language encoding model share one or more values for one or more parameters.

10. The computer-implemented method of claim 1, wherein:
the one or more first language segments comprise a plurality of first language segments; and
processing, by the computing system, the plurality of first language segments to generate the contextual language embedding comprises:
individually processing, by the computing system, each of the plurality of first language segments with the first machine-learned language encoding model to generate a respective individual language embedding; and
combining, the respective individual language embeddings for the plurality of first language segments to generate the contextual language embedding.

11. The computer-implemented method of claim 1, wherein at least one of the one or more first language segments comprises a first natural language and the subject language segment comprises a second natural language that is different from the first natural language.

12. The computer-implemented method of claim 1, further comprising additionally training, by the computing system, at least the first machine-learned language encoding model with a bitext retrieval loss function for a bitext retrieval task.

13. The computer-implemented method of claim 1, further comprising finetuning, by the computing system, at least the first machine-learned language encoding model with a natural language inference loss function for a premise segment and hypothesis segment that are in different languages.

14. A computing system, comprising:
one or more processors; and
one or more non-transitory computer-readable media that collectively store:
a machine-learned language encoding model configured to process a language segment that comprises a plurality of tokens to generate a contextual language embedding for the language segment that describes the language segment in an embedding space, wherein the machine-learned language encoding model has been trained using a loss function that evaluates an ability of an additional language encoding model to perform a masked language modeling task when conditioned upon embeddings generated by the machine-learned language encoding model; and
instructions that, when executed by a computing system comprising one or more computing devices, cause the computing system to perform operations, the operations comprising:
obtaining an additional language segment that contains multiple tokens;
using the machine-learned language encoding model to generate an embedding for the additional language segment; and
performing a language task based on the embedding for the additional language segment.

15. The computing system of claim 14, wherein the language task comprises sentence retrieval, sentence classification, bitext or translation retrieval, sentiment analysis, or conversational response selection.

16. The computing system of claim 14, further comprising, prior to performing the language task based on the embedding for the additional language segment, removing at least a first principal component from the embedding for the additional language segment.

17. One or more non-transitory computer-readable media that collectively store instructions that, when executed by a computing system comprising one or more computing devices, cause the computing system to perform operations, the operations comprising:
processing, by the computing system, one or more sets of context data with a first machine-learned encoding model to generate a contextual embedding for the one or more sets of context data;
generating, by the computing system, a masked version of a subject language segment, wherein the masked version of the subject language segment comprises one or more masked tokens;
combining, by the computing system, the contextual embedding and the masked version of a subject language segment to obtain a conditioned input;
processing, by the computing system, the conditioned input with a second machine-learned encoding model to generate one or more predictions respectively for the one or more masked tokens; and
modifying, by the computing system, one or more values of one or more parameters of at least the first machine-learned encoding model based on a loss function that compares the one or more predictions respectively with the one or more masked tokens.

18. The one or more non-transitory computer-readable media of claim 17, wherein the one or more sets of context data comprise an image.

19. The one or more non-transitory computer-readable media of claim 18, wherein the subject language segment comprises a textual caption that describes content depicted by the image.

20. The one or more non-transitory computer-readable media of claim 18, wherein the first machine-learned encoding model comprises a convolutional neural network, a long short term memory network, or a self-attention-based network.

* * * * *